(12) United States Patent
Proksa

(10) Patent No.: US 8,426,826 B2
(45) Date of Patent: Apr. 23, 2013

(54) COMBINED ASG, CATHODE, AND CARRIER FOR A PHOTON DETECTOR

(75) Inventor: Roland Proksa, Hamburg (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 256 days.

(21) Appl. No.: 13/054,504

(22) PCT Filed: Jul. 22, 2009

(86) PCT No.: PCT/IB2009/053182
§ 371 (c)(1),
(2), (4) Date: Jan. 17, 2011

(87) PCT Pub. No.: WO2010/015959
PCT Pub. Date: Feb. 11, 2010

(65) Prior Publication Data
US 2011/0122998 A1    May 26, 2011

Related U.S. Application Data

(60) Provisional application No. 61/086,829, filed on Aug. 7, 2008.

(51) Int. Cl.
*G01T 1/24* (2006.01)
(52) U.S. Cl.
USPC .................................................. 250/370.09

(58) Field of Classification Search ............. 250/370.09
See application file for complete search history.

(56) References Cited

U.S. PATENT DOCUMENTS

| 6,784,432 B2 | 8/2004 | Wieczorek |
| 2004/0104350 A1 | 6/2004 | Tsuchiya et al. |
| 2004/0251420 A1 | 12/2004 | Sun |
| 2008/0277589 A1* | 11/2008 | Seino et al. ............. 250/370.13 |

FOREIGN PATENT DOCUMENTS

| WO | 2006018779 A2 | 2/2006 |
| WO | 2008059425 A2 | 5/2008 |

* cited by examiner

*Primary Examiner* — David Porta
*Assistant Examiner* — Hugh H Maupin

(57) ABSTRACT

The present application relates to a combined anti-scatter grid, cathode, and carrier for a photon detector used in spectral CT imaging. The photon detector of the present application may include a cathode having at least one outwardly extending plate and at least one base plate, a substrate having at least one anode, and a converter material, such as for example, Cadmium Zinc Telluride ("CZT") or Cadmium Telluride. The at least one outwardly extending plate of the cathode may extend above the other detector components to act as an anti-scatter grid for the detector. Further, the at least one outwardly extending plate of the cathode may extend below the other detector components and be fixed to the at least one base plate of the detector. The converter material may be attached to at least one side of the at least one outwardly extending plate of the cathode.

16 Claims, 2 Drawing Sheets

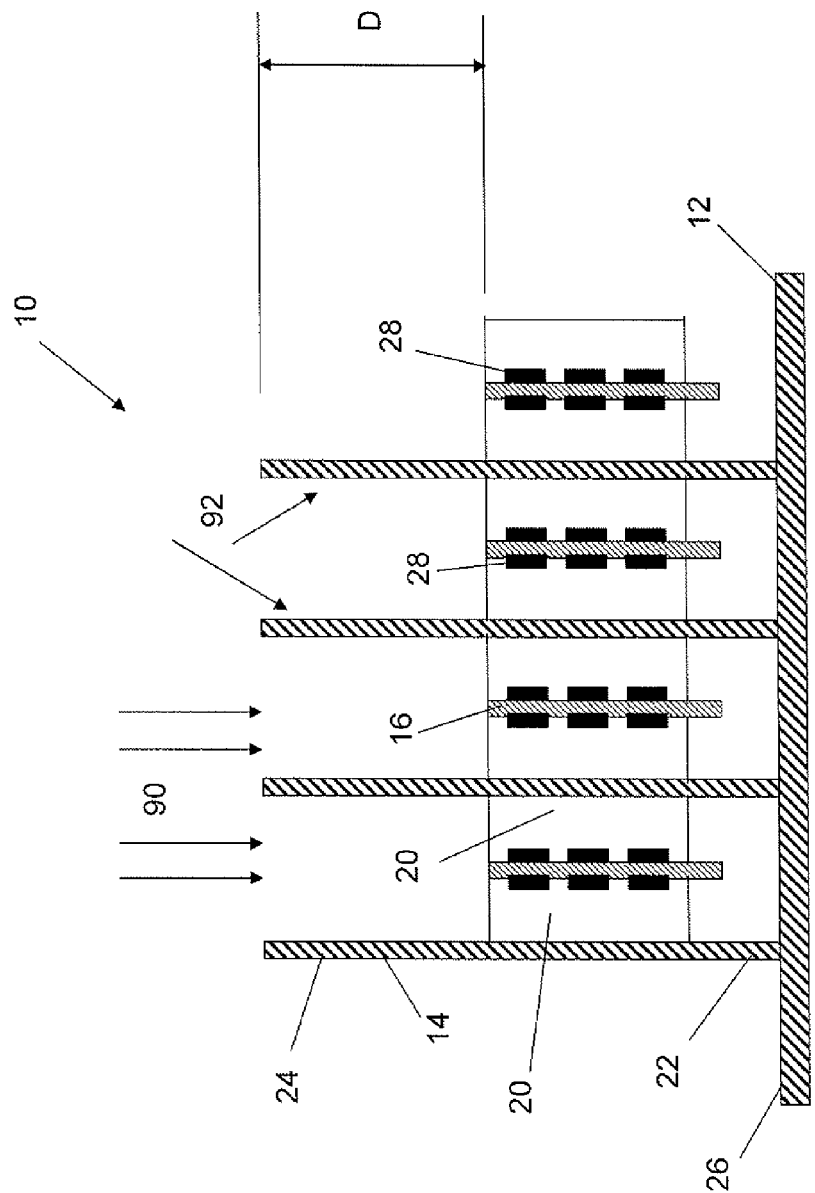

COMBINED ASG, CATHODE, AND CARRIER FOR A PHOTON DETECTOR

CROSS REFERENCE TO RELATED APPLICATIONS

Figure 1:
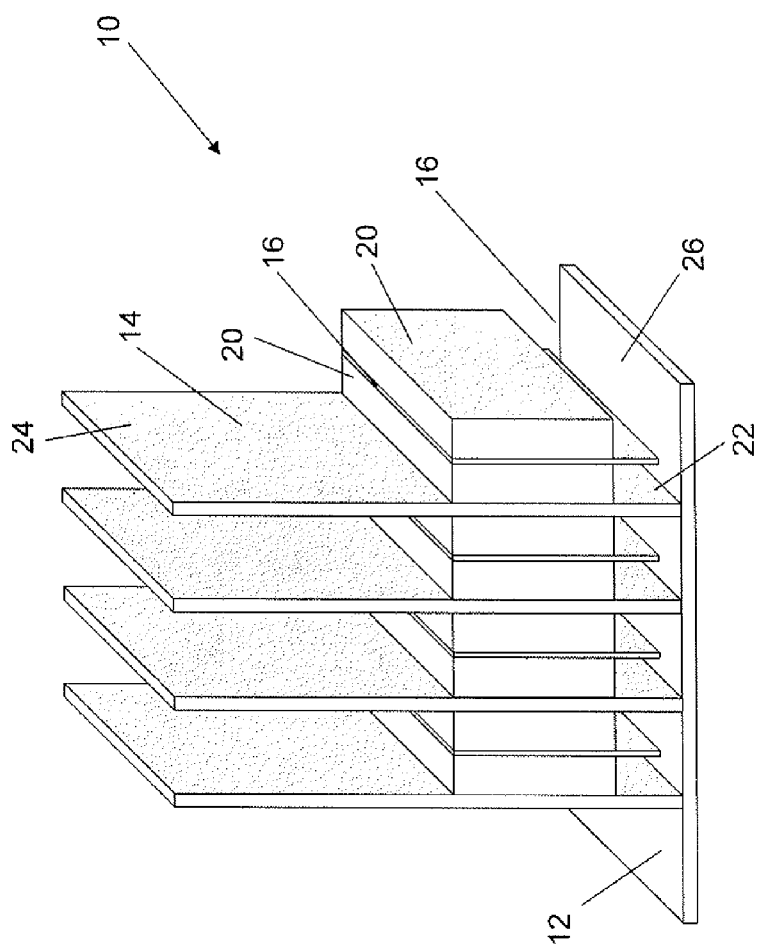

This application claims the benefit of U.S. provisional application Ser. No. 61/086,829 filed Aug. 7, 2008, which is incorporated herein by reference.

The present application relates to an x-ray photon detector. More specifically, the present application relates to a combined anti-scatter grid ("ASG"), cathode, and carrier for an edge-on photon counting detector especially useful in spectral computed tomography ("CT") imaging. It may find application in other detector applications as well.

Spectral CT imaging systems usually require photon counting detectors with high count rate capabilities. Photon counting detectors often comprise a cathode, a substrate containing structured anodes with electrical connections to readout electronics, and a converter between the cathode and anodes. Incoming x-ray photons interact with the converter to generate an electron cloud. An electrical field between the cathode and the anodes accelerates the electron cloud towards the anodes. The related pulse of the electron cloud is detected and counted by the electronics connected to the anodes. The pulse height allows for the detection of the energy of a photon. The maximal count rate of the photon detector depends on several properties of the system, such as the mean drift length of the electrons, the distance between the cathode and the anodes, and the thickness of the converter. The distance between the cathode and the anodes should be minimized and the converter should be thick enough to sufficiently stop the photons. Such a photon counting detector comprising edge-on geometry is described in PCT application PCT/IB 2007/054577, filed Nov. 12, 2007 and entitled "Radiation Detector with Multiple Electrodes on a Sensitive Layer," which is incorporated herein by reference.

The present application relates to a cathode for an edge-on photon counting detector used in spectral CT imaging that provides numerous advantages, such as for example, acting as an ASG and as a carrier for the detector components. Still further advantages of the present invention will be appreciated to those of ordinary skill in the art upon reading and understanding the following detailed description. The invention may take form in various components and arrangements of components, and in various steps and arrangements of steps. The drawings are only for purposes of illustrating the preferred embodiments and are not to be construed as limiting the invention.

FIG. 1 is a perspective view of a photon counting detector comprising edge-on geometry according to an embodiment of the invention, wherein the cathode acts as an ASG and a carrier for the other modules of the photon counting detector; and FIG. 2 is a cross sectional view of the photon counting detector of FIG. 1.

With reference to FIGS. 1 and 2, in an exemplary embodiment, a photon detector 10 is shown according to an embodiment of the present invention. The photon detector 10 includes a cathode 12, a substrate 16 having structured anodes 28, and a converter material 20. The cathode 12 of the photon detector 10 includes outwardly extending plates 14, or lamellas, and a base plate 26. The outwardly extending plates 14 are designed to substantially align with incoming x-ray photons 90. Each plate 14 includes a proximal end 22 and a distal end 24.

In the embodiment shown, the distal ends 24 of the outwardly extending plates 14 extend above the substrate 16 and converter material 20 of the photon detector 10 in the direction of the incoming x-ray photons 90. The distal ends 24 of the plates 14 may extend a distance D above the substrate 16 and converter material 20 of the photon detector 10, such as for example, 25 mm. As such, the plates 14 of the cathode 12 act as a one dimensional ASG for the photon detector 10. Although not shown, it should be apparent to those skilled in the art that the plates 14 may be positioned at various angles to those shown in FIGS. 1 and 2 to form a focal spot centered ASG for the photon detector.

As shown in FIGS. 1 and 2, the proximal ends 22 of the plates 14 extend below the substrate 16 and converter material 20 of the photon detector 10 and attach to the base plate 26 of the cathode 12. The proximal ends 22 of the plates 14 may attach to the base plate 26 by any suitable method known in the art, such as for example with an adhesive, screw, or other like fastener. Further, the plates 14 and the base plate 26 may be a unitary construction. Although the outwardly extending plates 14 are shown in FIGS. 1 and 2 at right angles to the base plate 26, it should be apparent to those skilled in the art that the plates may be disposed at various angles relative to the base plate. The fixation of the plates 14 to the base plate 26 below the other detector components provides for mechanical stability of the photon detector 10.

The cathode 12 may comprise one or more outwardly extending plates 14 and one or more base plates 26. The plates 14 and the base plate 26 may be various suitable shapes and sizes known in the art, such as for example, various thicknesses or non-rectangular. Further, the base plate 26 may be straight or arcuate.

The outwardly extending plates 14 and the base plate 26 of the cathode 12 may include any suitable material having a low electrical resistance (i.e., a conductive material) and capable of mechanically supporting the photon detector 10 components. Further, the plates 14 may include any suitable material having a high attenuation for x-rays, or high x-ray absorption properties. For example, the plates 14 may include a mixture of different metals and/or metal alloys, such as for example, tungsten and lead.

As shown in FIGS. 1 and 2, the converter material 20 of the photon detector 10 is attached to at least one side of the outwardly extending plate 14 of the cathode 12. The converter material 20 may be attached to the plate 14 by any suitable method known in the art that would provide a mechanical connection between the plate and the converter material, such as for example, with an adhesive. Further, the converter material 20 may include any suitable semiconductor material capable of interacting with incoming x-ray photons 90 to generate an electron cloud, such as for example, Cadmium Zinc Telluride ("CZT") or Cadmium Telluride.

In the embodiment shown, the substrate 16 is attached to the converter material 20 opposite the outwardly extending plate 14 of the cathode 12. The substrate 16 may be attached to the converter material 20 by any suitable method known in the art that would provide a good mechanical connection, and an electrical connection to the anodes 28. As such, the converter material 20 is trapped between the plate 14 of the cathode 12 and the substrate 16. The substrate 16 includes structured anodes 28 and electrical connections (not shown) to readout electronics. The thickness of the anodes 28 as shown in FIG. 2 is exaggerated for illustration purposes. Therefore, the electron cloud produced by the interaction between the converter material 20 and the incoming x-ray photons 90 will move toward the structured anodes 28 in the substrate 16. The related pulse of the electron cloud is detected and counted by the electronics connected to the anodes 28.

As shown in FIGS. 1 and 2, the cathode 12 acts as a mechanical carrier for the photon detector 10 components, or modules. In other words, the at least one base plate 26 of the cathode 12 supports the one or more outwardly extending plates 14 of the cathode. These plates 14 in turn support the converter material 20 and substrate 16 of the photon detector 10. As such, the cathode 12 acts as a carrier for the components, or modules, of the photon detector 10.

As shown in FIG. 2, the outwardly extending plates 14 of the cathode 12 also act as an ASG by absorbing incoming scattered or angled x-rays 92. As such, these scattered or angled x-rays 92 are prohibited from interacting with the converter material 20. Instead, only substantially vertical incoming x-ray photons 90 interact with the converter material 10 of the photon counting detector 10 to generate the electron cloud. Since the converter material 20 is attached to the planar plates 14 of the cathode 12, the plates are aligned with the converter material in the same plane (i.e., coplanar). As such, any adjustment between the plates 14 and the converter material 20 is inherent in the system. Further, combining the cathode 12 and ASG provides for a more structurally stable system than a photon detector having a separate ASG that must be independently aligned with the detector components.

The invention has been described with reference to the preferred embodiments. Modifications and alterations may occur to others upon reading and understanding the preceding detailed description. It is intended that the invention be constructed as including all such modifications and alterations insofar as they come within the scope of the appended claims or the equivalents thereof.

The invention claimed is:

1. A photon detector for an imaging device, comprising:
    a cathode comprising at least one outwardly extending plate and at least one base plate;
    a converter material attached to at least one side of the at least one outwardly extending plate; and
    a substrate comprising at least one anode and attached to the converter material;
    wherein the outwardly extending cathode plate supports the converter material and the substrate such that the outwardly extending cathode plate acts as a carrier, and the substrate and the at least one anode are not in contact with the cathode base plate.

2. The photon detector of claim 1, wherein a distal end of the at least one outwardly extending cathode plate extends above the converter material in a direction towards incoming photons.

3. The photon detector of claim 1, wherein the substrate is attached to the converter material opposite the at least one outwardly extending cathode plate.

4. The photon detector of claim 1, wherein the at least one outwardly extending cathode plate comprises a material having a high attenuation to x-rays and acts as an anti-scatter grid of the photon detector.

5. The photon detector of claim 1, wherein the at least one outwardly extending cathode plate comprises a material having a low electrical resistance.

6. The photon detector of claim 1, wherein the at least one outwardly extending cathode plate is attached to the at least one base plate.

7. The photon detector of claim 1, wherein the at least one outwardly extending cathode plate and the at least one base plate are a unitary structure.

8. The photon detector of claim 1, wherein the at least one outwardly extending cathode plate is disposed at a substantially right angle to the at least one cathode base plate.

9. The photon detector of claim 1, wherein the converter material comprises a semiconductor material that interacts with the incoming photons to generate an electron cloud.

10. The photon detector of claim 1, wherein the converter material comprises Cadmium Zinc Telluride.

11. The photon detector of claim 1, wherein the converter material comprises Cadmium Telluride.

12. The photon detector of claim 1, wherein the converter material is attached to the at least one outwardly extending cathode plate with an adhesive.

13. A photon detector for an imaging device, comprising:
    a cathode comprising a plurality of cathode plates, each of which extend outwardly from a common cathode base plate to a distal portion;
    a substrate comprising at least one anode, wherein an electric field is generated between the cathode and the at least one anode;
    a converter material disposed in the electric field between the cathode and the at least one anode; and
    wherein the distal portions of the plurality of cathode plates extend in a direction towards incoming photons above the converter material to absorb scattered photons.

14. The photon detector of claim 13, wherein the plurality of outwardly extending cathode plates comprise a material having a high attenuation to x-rays and acting as an anti-scatter grid of the photon detector.

15. The photon detector of claim 13, wherein the converter material and the substrate are disposed above and not in contact with the common cathode base plate.

16. A method of counting incoming photons in a photon detector, comprising the steps of:
    using a converter material in the photon detector to gather the energy of the incoming photons and generate an electron cloud corresponding to the energy of the incoming photons;
    generating an electric field between a cathode and an anode of the photon detector, wherein the converter material is disposed in the electric field between the cathode and the anode, such that the electron cloud moves to the anode to generate an electric signal corresponding to the energy of the incoming photons;
    electrically connecting the anode to readout electronics for analyzing the electric signal created by the electron cloud; and
    wherein the cathode comprises a plurality of cathode plates which extend outwardly from a common cathode base plate in a direction towards the incoming photons to a distal portion above the converter material to absorb scattered photons.

* * * * *